(12) United States Patent
Davoli et al.

(10) Patent No.: US 11,722,311 B2
(45) Date of Patent: *Aug. 8, 2023

(54) METHODS AND SYSTEMS FOR ENHANCED ENDPOINT IDENTITY VALIDATION IN ELECTRONIC TRANSACTIONS

(71) Applicant: Worldpay, LLC, Symmes Township, OH (US)

(72) Inventors: Damien M. Davoli, Springboro, OH (US); Jeremy Gifford, Cincinnati, OH (US); Ryan G. Fox, Lebanon, OH (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/668,586

(22) Filed: Feb. 10, 2022

(65) Prior Publication Data

US 2022/0271943 A1 Aug. 25, 2022

Related U.S. Application Data

(63) Continuation of application No. 16/682,817, filed on Nov. 13, 2019, now Pat. No. 11,283,621.

(51) Int. Cl.
*H04L 29/00* (2006.01)
*H04L 9/32* (2006.01)
(Continued)

(52) U.S. Cl.
CPC ......... *H04L 9/3242* (2013.01); *G06Q 20/401* (2013.01); *H04L 63/10* (2013.01); *H04L 2209/56* (2013.01)

(58) Field of Classification Search
CPC ... H04L 9/3242; H04L 63/10; H04L 2209/56; G06Q 20/401; G06Q 20/4014; G06Q 20/405; G06Q 20/3829
See application file for complete search history.

(56) References Cited

U.S. PATENT DOCUMENTS 10,372,440 B1 * 8/2019 Koeppel ............... H04L 9/083
10,643,122 B1 * 5/2020 Choque ................. G06N 3/08
(Continued)

OTHER PUBLICATIONS

Maazouz et al., "Protocol Payment in M-Commerce Transaction", *IOSR Journal of Computer Engineering (IOSR-JCE)*, e-ISSN: 2278-0661, p-ISSN: 2278-8727, vol. 17, Issue 6, Ver. V (No.v-Dec. 2015). pp. 98-101, (year: 2015).

*Primary Examiner* — Don G Zhao
(74) *Attorney, Agent, or Firm* — Bookoff McAndrews, PLLC

(57) ABSTRACT

Methods and systems are disclosed for merchant system identity validation. One method comprises generating, by an access management system, a primary key associated with an integrator system and transmitting the primary key to the integrator system. The access management system may also generate a hash value associated with a merchant system, and may transmit the hash value to the merchant system. When a payment transaction is initiated at the merchant system, the access management system may receive an authorization request comprising a key-hash pair. The key-hash pair may be validated against a validation database. Upon successful validation, the access management system may transmit the authorization request to an acquirer processor.

20 Claims, 8 Drawing Sheets

(51) Int. Cl.
*G06Q 20/40* (2012.01)
*H04L 9/40* (2022.01)

(56) References Cited

U.S. PATENT DOCUMENTS

| | | | | |
|---|---|---|---|---|
| 10,671,375 | B1* | 6/2020 | Koeppel | G06F 8/65 |
| 10,931,461 | B2* | 2/2021 | Dilles | G06F 21/33 |
| 2002/0156761 | A1* | 10/2002 | Chen | G06Q 10/10 |
| 2002/0156785 | A1* | 10/2002 | Kumar | G06F 11/079 |
| 2002/0157017 | A1* | 10/2002 | Mi | G06Q 10/107 |
| | | | | 714/E11.027 |
| 2003/0018643 | A1* | 1/2003 | Mi | G06F 11/079 |
| 2007/0106805 | A1* | 5/2007 | Marples | H04L 67/06 |
| | | | | 709/229 |
| 2007/0143227 | A1* | 6/2007 | Kranzley | G06Q 20/02 |
| | | | | 705/67 |
| 2012/0036317 | A1* | 2/2012 | Torii | G06F 16/90339 |
| | | | | 711/216 |
| 2012/0191615 | A1* | 7/2012 | Schibuk | G06Q 20/401 |
| | | | | 705/76 |
| 2015/0121517 | A1* | 4/2015 | Dimov | G06F 21/445 |
| | | | | 726/20 |
| 2017/0185527 | A1* | 6/2017 | Ueda | G06F 12/1018 |
| 2019/0108515 | A1* | 4/2019 | Lakka | G06Q 20/385 |
| 2019/0188731 | A1* | 6/2019 | Roberts | G06Q 20/3825 |
| 2020/0043003 | A1* | 2/2020 | Corella | H04L 9/3268 |

\* cited by examiner

METHODS AND SYSTEMS FOR ENHANCED ENDPOINT IDENTITY VALIDATION IN ELECTRONIC TRANSACTIONS

CROSS-REFERENCE TO RELATED APPLICATION(S)

This patent application is a continuation of and claims the benefit of priority to U.S. application Ser. No. 16/682,817, filed on Nov. 13, 2019, the entirety of which is incorporated herein by reference.

TECHNICAL FIELD

The present disclosure relates generally to the field of electronic transaction processing and, more particularly, to validating identities of merchant systems from which electronic transactions are originated.

BACKGROUND

Electronic transactions and networks are used for a great number of purchases and sales between merchants and credit cardholders. A normal card transaction may involve a number of parties, including an account holder who possesses a card, a merchant, an acquirer processor, an issuer processor, an issuer financial institution, and a card association network. Millions of such transactions occur daily at merchants using a variety of payment card types, such as credit cards, debit cards, prepaid cards, and so forth. Due to the nature of these transactions, sensitive data may be retained by one or more parties. Thus, security is a main concern in the field of electronic transactions technology. For example, a compromised merchant system may lead to a variety of undesirable outcomes involving multiple parties.

SUMMARY OF THE DISCLOSURE

According to certain aspects of the present disclosure, methods and systems are disclosed for validating identities of merchant systems from which electronic transactions are originated.

One embodiment provides a method for merchant system identity validation, comprising: generating, by an access management system, a primary key associated with an integrator system; transmitting, by the access management system, the primary key to the integrator system; generating, by the access management system, a hash value associated with a merchant system; transmitting, by the access management system, the hash value to the merchant system; receiving, by the access management system, an authorization request comprising a key-hash pair; validating, by the access management system, the key-hash pair against a validation database; and transmitting, by the access management system, the authorization request to an acquirer processor.

One embodiment provides a system for merchant system identity validation. The system may comprise one or more processors; and at least one data storage comprising instructions which, when executed by the one or more processors, cause the one or more processors to perform a method comprising: generating, by an access management system, a primary key associated with an integrator system; transmitting, by the access management system, the primary key to the integrator system; generating, by the access management system, a hash value associated with a merchant system; transmitting, by the access management system, the hash value to the merchant system; receiving, by the access management system, an authorization request comprising a key-hash pair; validating, by the access management system, the key-hash pair against a validation database; and transmitting, by the access management system, the authorization request to an acquirer processor.

One embodiment provides a non-transitory computer readable medium for merchant system identity validation. The non-transitory computer readable medium may store instructions which, when executed by one or more processors, cause the one or more processors to perform a method comprising: generating, by an access management system, a primary key associated with an integrator system; transmitting, by the access management system, the primary key to the integrator system; generating, by the access management system, a hash value associated with a merchant system; transmitting, by the access management system, the hash value to the merchant system; receiving, by the access management system, an authorization request comprising a key-hash pair; validating, by the access management system, the key-hash pair against a validation database; and transmitting, by the access management system, the authorization request to an acquirer processor.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

BRIEF DESCRIPTION OF THE DRAWINGS

The accompanying drawings, which are incorporated in and constitute a part of this specification, illustrate exemplary embodiments of the present disclosure and, together with the description, serve to explain the principles of the disclosure.

DETAILED DESCRIPTION

Figure 1:
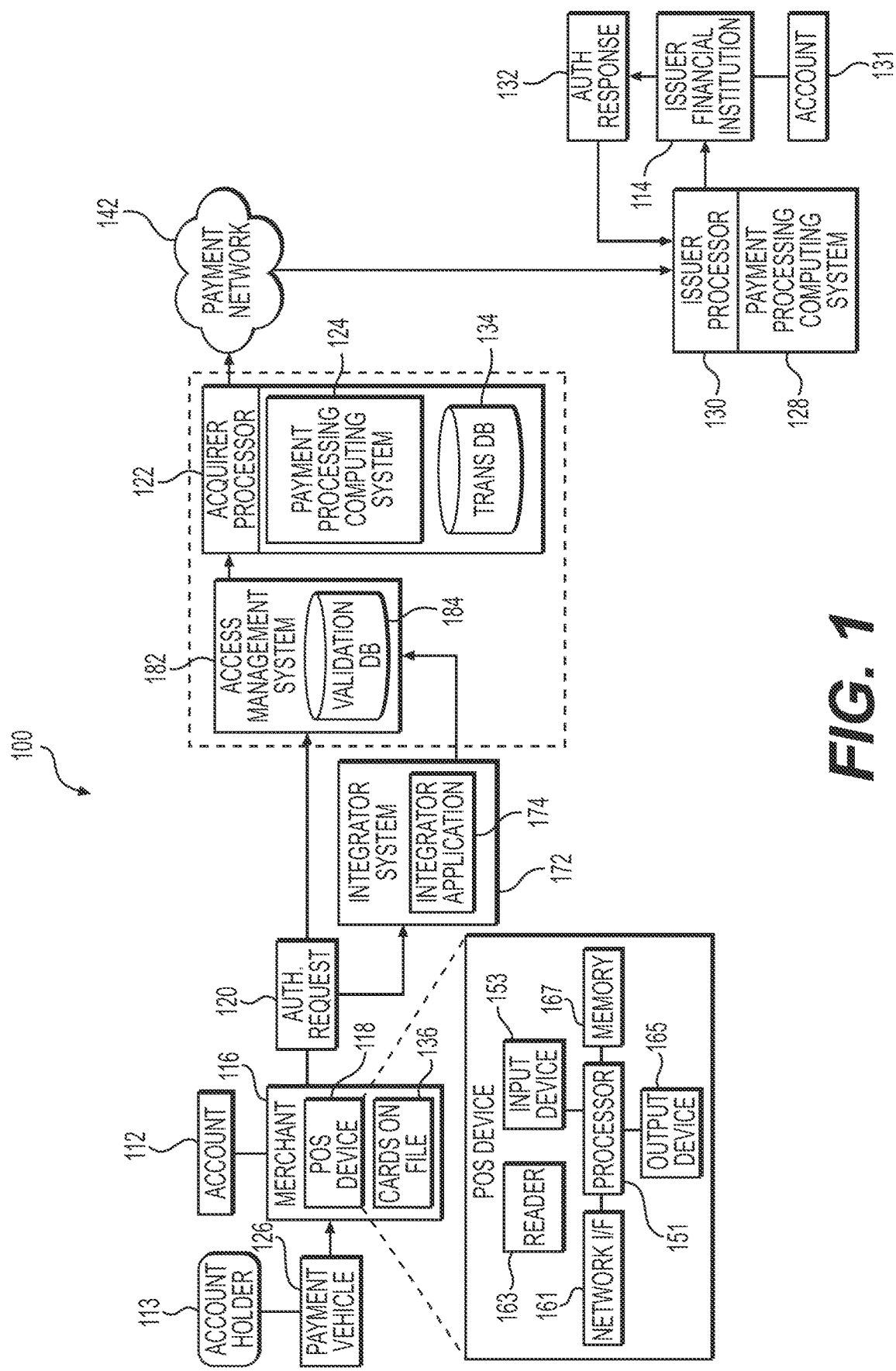
FIG. 1 depicts a block diagram of an example payment environment for performing electronic requests of payment transactions over an electronic network.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the following description.

Various non-limiting embodiments of the present disclosure will now be described to provide an overall understanding of the principles of the structure, function, and use of systems and methods disclosed herein for merchant endpoint validation.

For simplicity, the description that follows will be provided by reference to a "payment vehicle," which generally refers to any type of financial alternative to currency. As is to be clear to those skilled in the art, no aspect of the present disclosure is limited to a specific type of payment vehicle. Therefore, it is intended that the following description encompasses the use of the present disclosed techniques with many other forms of financial alternatives to currency, including credit cards, debit cards, smart cards, single-use cards, pre-paid cards, electronic currency (such as might be provided through a cellular telephone or personal digital assistant), and the like. Payment vehicles may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A payment vehicle may also have electronic functionality provided by a network of electronic circuitry that is printed or otherwise incorporated onto or within the payment vehicle (and typically referred to as a "smart card"), or be a fob having a transponder and an RFID reader, or may operate as a mobile/digital wallet or by near field communication (NFC).

Typically, a group of merchant systems (e.g., a group of point of sale (POS) terminals) allocated to a dedicated line may share login credentials to access and/or pass certain transaction data to downstream systems, such as, e.g., acquirer processors. An acquirer processor may validate the identities of those merchant systems based on the shared login credentials. However, when it is determined that one or some of those merchant systems may have been compromised, the entire group of merchant systems sharing the login credentials may be taken down to eliminate or mitigate further security concerns. Further, the level of security permitted via shared login credentials may be outdated and insufficient.

Method and systems contemplated in the current disclosure may solve or mitigate the foregoing problems by providing an enhanced merchant system identity validation method. In one embodiment, each merchant system may be provided with two pieces of information that uniquely identify the merchant system: a primary key and a hash value. The merchant system may include the primary key and hash value (i.e., key-hash pair) with transaction data sent to an acquirer processor, in order for an access management system to validate the identity of the merchant system based on the key-hash pair. The access management system may be situated between the merchant system and the acquirer processor. Upon successful validation by the access management system, the transaction data coming from the merchant system may be allowed access to the acquirer processor. In the event that a merchant system becomes compromised, the access management system may be able to pinpoint and block traffic originating from the compromised merchant system based on the unique key-hash pair associated with the compromised merchant system, without impacting traffic coming from other merchant systems.

One or more examples of these non-limiting embodiments are illustrated in the selected examples disclosed and described in detail with reference to FIGS. 1-7 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

FIG. 1 depicts a block diagram of an example payment environment 100 for performing electronic requests of payment transactions over an electronic network. In the example payment environment 100, a payment vehicle 126 (e.g., a credit card) may be issued to an account holder 113 by an issuer financial institution 114. Issuer financial institution 114 may be any of a variety of financial institutions that is capable of issuing a payment vehicle to an account holder. Payment vehicle 126 may be used to pay a merchant 116 (i.e., merchant system 116) for a purchase transaction at a merchant point of sale (POS) device 118. Merchant POS device 118 may be any device that facilitates receipt of a payment vehicle for payment of a purchase, such as for example, a POS terminal or a web interface. Further, merchant 116 may be any type of merchant or service provider, such as, for example, a brick-and-mortar merchant, an online merchant, a mobile merchant, a kiosk, or any other type of merchant or device configured to receive payment cards, or electronic or mobile wallets, from account holders as a form of payment.

POS device 118 may be configured to interact with payment vehicle 126 to obtain account information about a consumer account affiliated with account holder 113. As shown in the depicted callout of POS device 118, in one or more embodiments, POS device 118 may include a memory 167 coupled to processor 151, which may control the operations of a reader 163, an input device 153, an output device 165, and a network interface 161. Memory 167 may store instructions for processor 151 and/or data, such as, for example, an identifier that is associated with merchant account 112.

In one or more embodiments, reader 163 may include a magnetic strip reader. In one or more embodiments, reader 163 may include a contactless reader, such as, for example, a radio frequency identification (RFID) reader, a near field communications (NFC) device configured to read data via magnetic field coupling (in accordance with ISO standard 14443/NFC, for example), a Bluetooth transceiver, a Wi-Fi transceiver, an infrared transceiver, a laser scanner, and so forth.

In one or more embodiments, input device 153 may include key buttons that may be used to enter the account information directly into POS device 118 without the physical presence of payment vehicle 126. Input device 153 may be configured to provide further information to initiate a transaction, such as, for example, a personal identification number (PIN), password, zip code, etc., or in combination with the account information obtained from payment vehicle 126. In one or more embodiments, output device 165 may include a display, a speaker, and/or a printer to present information, such as, for example, the result of an authorization request, a receipt for the transaction, an advertisement, and so forth.

In one or more embodiments, network interface 161 may be configured to communicate with acquirer processor 122 such as, for example, via a telephone connection, an Internet connection, or a dedicated data communication channel.

In one or more embodiments, the instructions stored in memory 167 may be configured at least to cause POS device 118 to send an authorization request message, or any transaction-related message in a compliant format, to acquirer processor 122 to initiate a transaction.

In some embodiments, the instructions stored in memory 167 may be configured to cause POS device 118 to send an authorization request message, or any transaction-related message in a compliant format, to integrator system 172. Integrator system 172 may develop applications and systems configured to perform payment processing operations and/or provide other functionalities in connection with services and data provided by an acquirer processor. Examples of integrator system 172 comprise integrators, independent software vendors (ISVs), and value-added resellers (VARs). Integrator system 172 may provide software and corresponding updates to merchant system 116, so that merchant system 116 may communicate with integrator system 171 as well as acquirer processor 122 to perform electronic payment transactions. Integrator system 172 may, using the integrator application 174, receive an authorization request, perform any assigned functions (e.g., message validation, message translation, data extraction, value-added services, message routing, security-related functions, etc.), and forward the authorization request to acquirer processor 122.

In general, small-to-medium merchants may be more likely to use services provided by integrator systems, as they may not have the resources to develop software or other tools to directly integrate with acquirer processors. Under those circumstances, integrator systems may provide software and other tools to merchants, enabling the merchants to communicate and process transactions with acquirer processors. In contrast, large merchants typically have the resources enabling direct integration with acquirer processors. Nonetheless, large merchants may use the services provided by integrator systems, and small-to-medium merchants may opt to directly integrate with acquirer processors.

In one or more embodiments, POS device 118 may have fewer components than those illustrated in FIG. 1. For example, in one or more embodiments, POS device 118 may be configured for "card-not-present" transactions; and POS device 118 may not have a reader 163. In one or more embodiments, POS device 118 may have more components than those illustrated in FIG. 1.

During a purchase event, merchant POS device 118 may send an authorization request 120 for the purchase transaction to acquirer processor 122 that processes payment vehicle transactions for merchant 116. Although not explicitly shown in FIG. 1, additional intermediary entities, such as one or more payment gateways, may assist with the handling and routing of authorization request 120 or other related messages in transit. Authorization request 120 may include identifying information from payment vehicle 126, such as a BIN number, an expiration date, and a first and last name of the account holder, for example. Authorization request 120 may further include identifying information from the purchase, such as an amount and identifying information from merchant POS device 118 and/or merchant 116, for example. The identifying information from payment vehicle 126 and from the purchase may be collectively referred to as transaction data. Furthermore, authorization request 120 may include information uniquely identifying the merchant 116 and/or the merchant POS device 118, which will be explained in greater detail in the following sections.

According to one aspect of the current disclosure, authorization request 120 may be routed to an access management system 182 prior to being allowed access to the acquirer processor 122. Thus, access management system 182 may be situated between the acquirer processor 122 and an upstream entity, e.g., merchant system 116 or integrator system 172, as shown in FIG. 1. In a sense, access management system 182 may act as a gatekeeper of the acquirer processor 112, allowing only validated messages to pass through to the acquirer processor 112. For the purposes of illustration, access management system 182 may be considered part of acquirer processor 112, as suggested by the dotted line. Access management system 182 may be configured to validate authorization request 120. Specifically, access management system 182 may validate the identity of the merchant system 116 from which authorization request 120 is received based on certain data included in or appended to authorization request 120. For example, the data included in authorization request 120 may be compared to data stored in validation database 184, in order to determine whether there is a match. The interplay between merchant system 116, integrator system 172, and access management system 182 will be described in greater detail in the following sections (e.g., in reference to FIGS. 2-7). Upon successful validation at the access management system 182, authorization request 120 may be transmitted to acquirer processor 122 for further processing. POS device 118 may or may not send a separate request for the clearing and settling of the transaction. The instructions stored in memory 167 also may be configured to cause POS device 118 to perform other types of functions discussed in this description.

In one or more embodiments, payment vehicle 126 may be used to establish a recurring billing arrangement between account holder 113 and merchant 116. An initial transaction may allow merchant 116 to store account information that may be used for subsequent billing events. The account information may be stored in a cards-on-file storage 136. For example, the purchase event illustrated in FIG. 1 may be associated with a subscription, membership plan, installment payment plan between merchant 116 and account holder 113, and so on. For subsequent transactions, merchant 116 may access cards-on-file storage 136 to retrieve the relevant account information. The subsequent transactions may not require direct involvement from account holder 113. In one or more embodiments, account holder 113 may trigger the subsequent transaction, but may not provide payment vehicle 126 to merchant 116, as merchant 116 may access the cardholder's account information in cards-on-file storage 136.

A payment processing computing system 124 at acquirer processor 122 may receive authorization request 120 from merchant 116. Payment processing computing system 124 may translate authorization request 120, if necessary, and may provide authorization request 120 to a payment network 142. Payment network 142 may be, for example, a network of a credit card association affiliated with payment vehicle 126. Non-limiting examples of credit card associations include VISA, MASTERCARD, DISCOVER, and AMERICAN EXPRESS, and so on. Authorization request 120 then may be provided to a payment processing computing system 128 at an issuer processor 130. In response to receiving the authorization request, and based on the type of payment vehicle 126, payment processing computing system 128 may provide authorization request 120 to issuer financial institution 114. Using information from authorization request 120, issuer financial institution 114 may associate the purchase transaction with an account 131 of account holder 113 held by issuer financial institution 114. Issuer financial institution 114 then may send an authorization response 132 which may either approve or deny the transaction. Authorization response 132 may be provided to payment processing computing system 128 at issuer processor 130 and then provided to payment network 142. Authorization response 132 then may be provided to payment processing computing system 124 at acquirer processor 122. Upon receiving authorization response 132, payment processing computing system 124 may send either an approval message or a denial message to merchant POS device 118 to complete the purchase transaction. If the purchase transaction is approved, it may be posted to account holder's account 131 and reconciled later with account holder 113 and merchant 116.

Transaction records may be stored in one or more locations within system 100. In one or more embodiments, the transaction record may be stored within a transaction data database 134 of acquirer processor 122. The transaction data may be received by transaction data database 134 from various sources, such as merchant POS device 118, merchant 116, acquirer processor 122, and so on. A plurality of transaction parameters associated with the purchase transaction may be stored in each transaction record, which may generally be used for settlement and financial recordkeeping. While the transaction parameters stored in each transaction record may vary, example transaction parameters may include, without limitation, account number, card number, payment vehicle information, product information (such as product type, product serial number, and so forth), transaction amount, loyalty account information, merchant information, transaction amount, response code, transaction date, transaction time, whether the transaction was a "card present" transaction, and so on.

Figure 2:
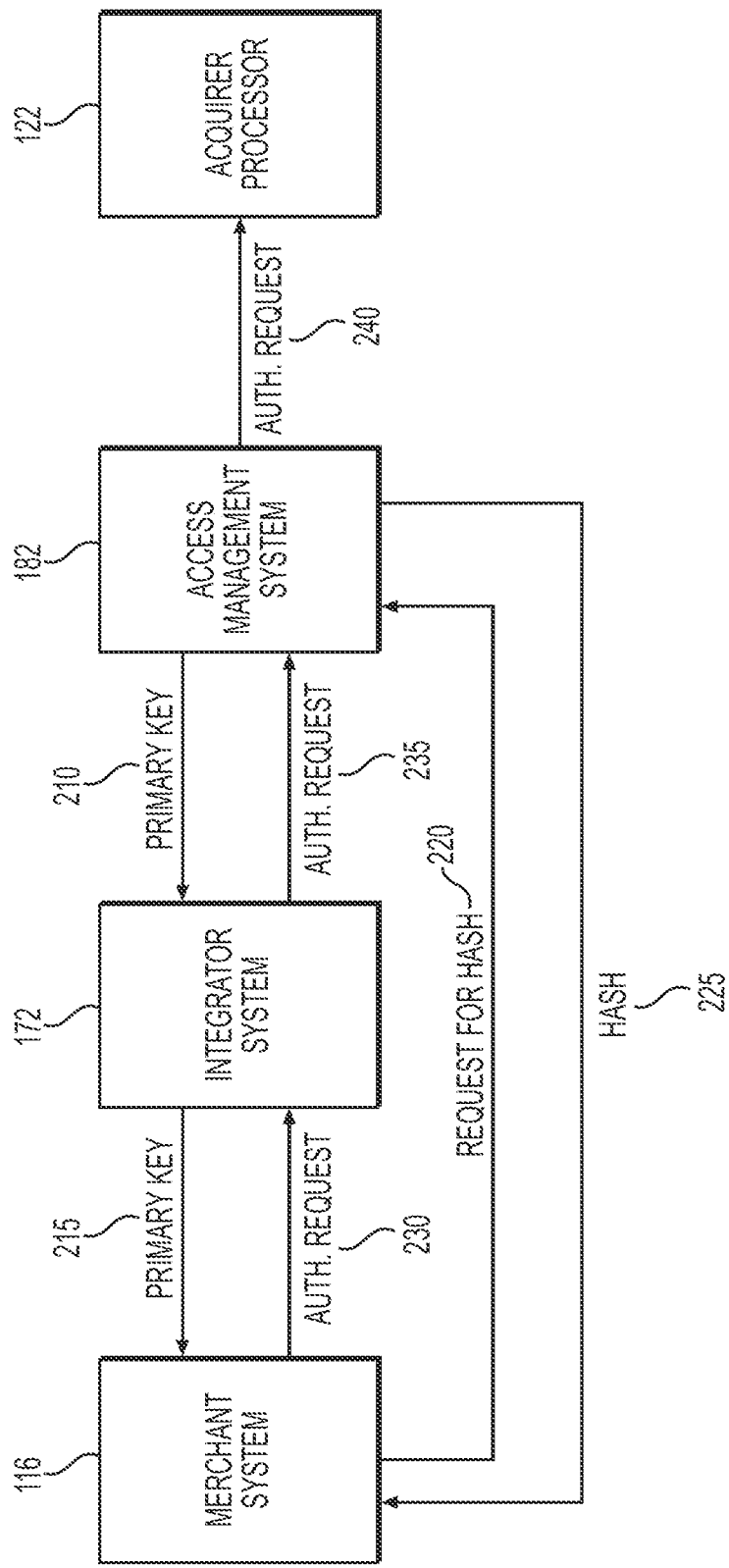
FIG. 2 is a schematic block diagram illustrating an exemplary scenario in which access management system may perform validation of an authorization request, according to one aspect of the present disclosure.

FIG. 2 is a schematic block diagram illustrating an exemplary scenario in which access management system 182 may perform validation of authorization request 120, according to one aspect of the present disclosure. Notably, FIG. 2 illustrates a scenario where integrator system 172 may be involved with payment processing-related software deployment to merchant system 116 as well as authorization request routing. Initially, access management system 182 may generate a primary key that is unique to integrator system 172. The primary key may generated by applying a key-generating algorithm to a string of text or block of data that is unique to, or that uniquely identifies integrator system 172. As a result, the primary key may be unique to integrator system 172. Access management system 182 may then store the primary key in a local storage or in a remote storage in communication with access management system 182 (e.g., validation database 184). At step 210, access management system 182 may transmit the primary key to integrator system 172. Upon receiving the primary key, integrator system 172 may store the primary key in a local storage or in a remote storage in communication with integrator system 172. Integrator system 172 may be configured to deploy payment processing-related software to merchant system 116. At step 215, integrator system 172 may transmit such payment processing-related software to merchant system 116, along with the primary key. In some embodiments, the primary key may be "embedded" within the deployed software. In other embodiments, the primary key and payment processing-related software may be transmitted to merchant system 116 separately (e.g., as separate data objects). The payment processing-related software may then be automatically installed on the merchant system 116, or may be installed manually by an operator of the merchant system 116. Merchant system 116 may also store the primary key in a local storage or in a remote storage in communication with merchant system 116.

During a first boot or update following the installation, the software received from integrator system 172 may be configured to automatically call out to access management system 182 for a hash value unique to merchant system 116. For instance, at step 220, the payment processing-related software installed on merchant system 116 may transmit a request for a hash value to access management system 182. Upon receiving the request for a hash value, access management system 182 may generate the hash value by applying a hash function to a string of text or block of data that is unique to, or that uniquely identifies merchant system 116. As a result, the hash value may be unique to merchant system 116. Access management system 182 may then store the hash value in a local storage or in a remote storage in communication with access management system 182 (e.g., validation database 184). At this point, access management system 182 may have both the primary key and the hash value associated with merchant system 116. This reference key-hash pair (i.e., the primary key and hash value that are associated with a merchant system and stored at access management system 182) may be used by access management system 182 to validate incoming authorization requests and other data originating from merchant system 116. At step 225, access management system 182 may transmit the hash value to merchant system 116. Upon receiving the hash value, merchant system 116 may store the hash value in a local storage or in a remote storage in communication with merchant system 116. In some embodiments, merchant system 116 may store the hash value in association with the primary key received at step 215. The combination of the primary key and the hash value (i.e., key-hash pair) may uniquely identify merchant system 116, and may be used in a validation process contemplated by the current disclosure.

Upon a payment event being initiated at merchant system 116 (e.g., account holder 113 presenting payment vehicle 126 at POS device 118, etc.), merchant system 116 may generate an authorization request comprising transaction data. Merchant system 116 may also include the key-hash pair in the authorization request. Specifically, the payment processing-related software may be configured to generate such an authorization request. At step 230, merchant system 116 may transmit the authorization request comprising transaction data and the key-hash pair to integrator system 172.

Integrator system 172 may perform any assigned functions based on the authorization request. Then, at step 235, integrator system 172 may forward the authorization request to access management system 182. Access management system 182 may then perform steps to validate the authorization request. More specifically, access management system 182 may validate merchant system 116 from which the authorization request is originated, using the key-hash pair included in the authorization request. In essence, access management system 182 ensures that merchant system 116 has been authorized to transmit authorization requests to acquirer processor 122. In one embodiment, access management system 182 may extract the key-hash pair from the authorization request, compare the key-hash pair with the previously-stored primary keys and hash values, and determine whether there is a match. In other words, access management system 182 may validate the primary key and hash value from the key-hash pair against primary keys and hash values previously-generated and stored by access management system 182 (i.e., against reference key-hash pairs). If there is a match, at step 240, access management system 182 may transmit the authorization request to acquirer processor 122 for further processing. The authorization request transmitted to acquirer processor 122 may or may not comprise the key-hash pair. If there is no match however, access management system 182 may not allow the authorization request to pass through to acquirer processor 122, and may transmit a decline message to integrator system 172 or merchant system 116.

Figure 3:
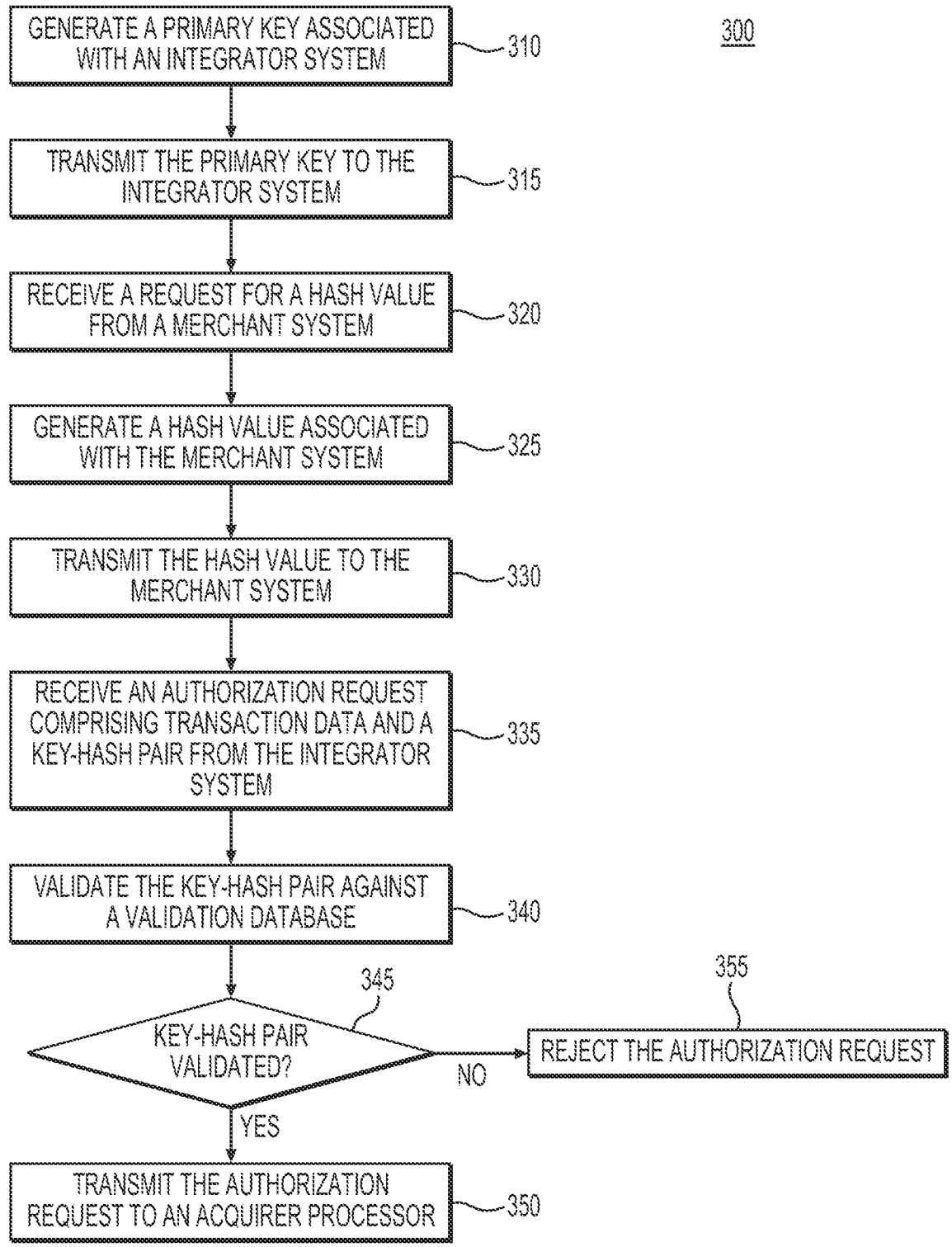
FIG. 3 is a flowchart illustrating an exemplary method of validating an authorization request, according to one aspect of the present disclosure.

FIG. 3 is a flowchart illustrating an exemplary method of validating an authorization request, according to one aspect of the present disclosure. Notably, method 300 may be performed by access management system 182, and may correspond to the steps performed by access management system 182 in the exemplary scenario illustrated in FIG. 2. At step 310, access management system 182 may generate a primary key associated with integrator system 172. As described above, the primary key may be unique to integrator system 172. At step 315, access management system 182 may transmit the primary key to integrator system 172. Integrator system 172 may then deploy payment processing-related software to merchant system 116, and may also transmit the primary key to merchant system 116.

The payment processing-related software may be installed on merchant system 116, and may transmit a request for a hash value to access management system 182 during a first boot or update. Accordingly, at step 320, access management system 182 may receive a request for a hash value from merchant system 116. At step 325, access management system 182 may generate a hash value associated with merchant system 116, responsive to the request. As described above, the hash value may be unique to merchant system 116. At step 330, access management system 182 may transmit the hash value to merchant system 116.

Upon a payment event initiated at merchant system 116, merchant system 116 may generate and transmit an authorization request comprising transaction data and a key-hash pair to access management system 182, via integrator system 172. At step 335 therefore, access management system 182 may receive an authorization request comprising transaction data and a key-hash pair from integrator system 172. At step 340, access management system 182 may validate the key-hash pair against validation database 184. As alluded to above, validation database 184 may comprise primary keys and hash values that were previously generated for integrator systems and merchant systems, respectively (i.e., reference key-hash pairs), across the network (e.g., Internet). At step 345, access management system 182 may determine whether a primary key and a hash value that match the primary key and the hash value of the key-hash pair exist in the validation database 184 (i.e., whether a reference key-hash pair that matches the key-hash pair in the authorization request exists in the validation database 184). If there is a match, method 300 may proceed to step 350, where access management system 182 may transmit the authorization request to acquirer processor 122. If there is no match (i.e., any one of the key-hash pair does not have a matching value in the validation database 184), method 300 may proceed to step 355, where access management system 182 may reject the authorization request, and transmit a decline message to integrator system 172 and/or merchant system 116.

Figure 4:
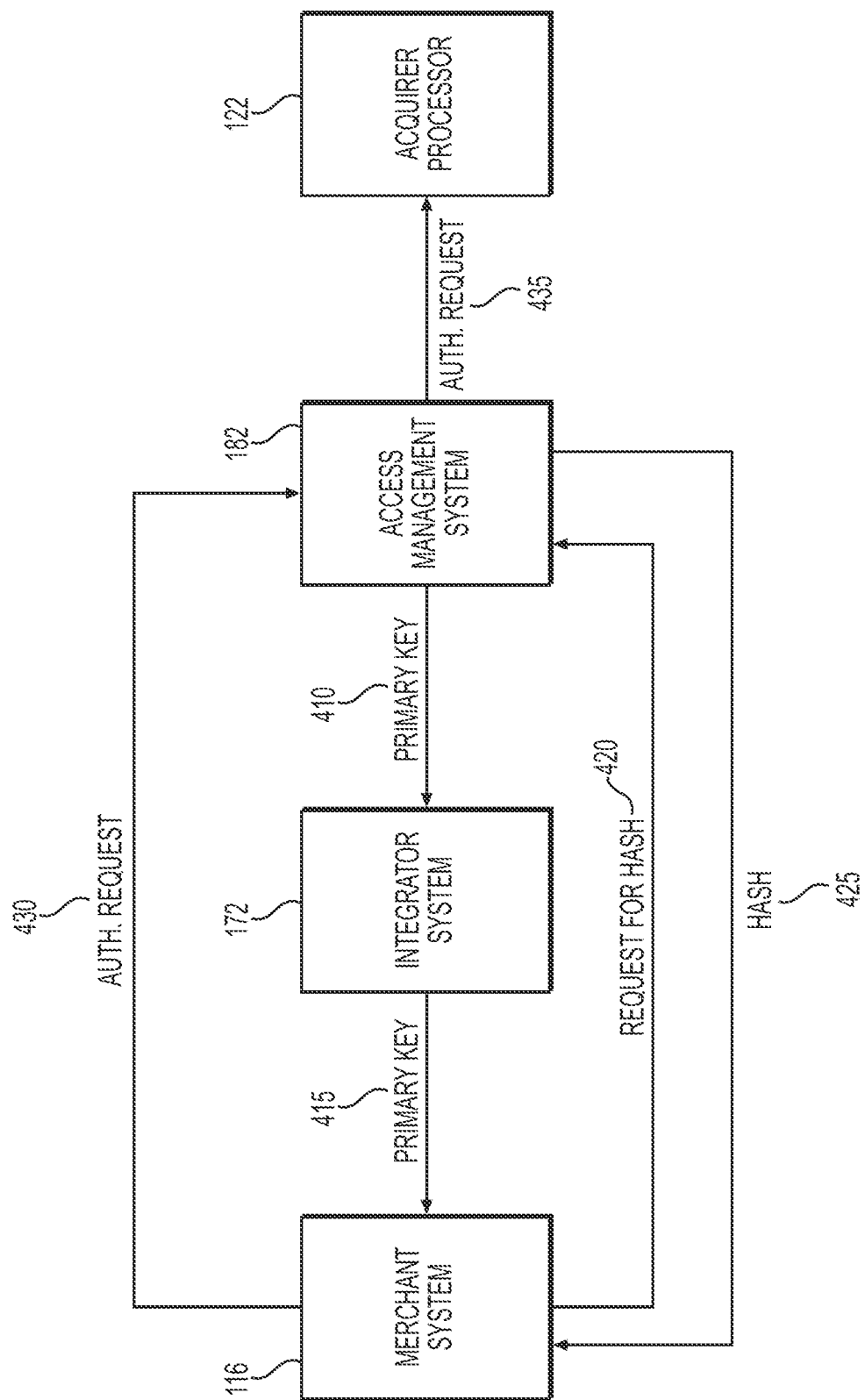
FIG. 4 is a schematic block diagram illustrating another exemplary scenario in which access management system may perform validation of an authorization request, according to one aspect of the present disclosure.

FIG. 4 is a schematic block diagram illustrating another exemplary scenario in which access management system 182 may perform validation of authorization request 120, according to one aspect of the present disclosure. Notably, FIG. 4 illustrates a scenario where integrator system 172 may be involved with payment processing-related software deployment to merchant system 116, but not authorization request routing. Initially, access management system 182 may generate a primary key that is unique to integrator system 172. The primary key may generated by applying a key-generating algorithm to a string of text or block of data that is unique to, or that uniquely identifies integrator system 172. As a result, the primary key may be unique to integrator system 172. Access management system 182 may then store the primary key in a local storage or in a remote storage in communication with access management system 182 (e.g., validation database 184). At step 410, access management system 182 may transmit the primary key to integrator system 172. Upon receiving the primary key, integrator system 172 may store the primary key in a local storage or in a remote storage in communication with integrator system 172. Integrator system 172 may be configured to deploy payment processing-related software to merchant system 116. At step 415, integrator system 172 may transmit such payment processing-related software to merchant system 116, along with the primary key. In some embodiments, the primary key may be "embedded" within the deployed software. In other embodiments, the primary key and payment processing-related software may be transmitted to merchant system 116 separately (e.g., as separate data objects). The payment processing-related software may then be automatically installed on the merchant system 116, or may be installed manually by an operator of the merchant system 116. Merchant system 116 may also store the primary key in a local storage or in a remote storage in communication with merchant system 116.

During a first boot or update following the installation, the software received from integrator system 172 may be configured to automatically call out to access management system 182 for a hash value unique to merchant system 116. For instance, at step 420, the payment processing-related software installed on merchant system 116 may transmit a request for a hash value to access management system 182. Upon receiving the request for a hash value, access management system 182 may generate the hash value by applying a hash function to a string of text or block of data that is unique to, or that uniquely identifies merchant system 116. As a result, the hash value may be unique to merchant system 116. Access management system 182 may then store the hash value in a local storage or in a remote storage in communication with access management system 182 (e.g., validation database 184). At this point, access management system 182 may have both the primary key and the hash value associated with merchant system 116. This reference key-hash pair (i.e., the primary key and hash value that are associated with a merchant system and stored at access management system 182) may be used by access management system 182 to validate incoming authorization requests and other data originating from merchant system 116. At step 425, access management system 182 may transmit the hash value to merchant system 116. Upon receiving the hash value, merchant system 116 may store the hash value in a local storage or in a remote storage in communication with merchant system 116. In some embodiments, merchant system 116 may store the hash value in association with the primary key received at step 415. The combination of the primary key and the hash value (i.e., key-hash pair) may uniquely identify merchant system 116, and may be used in a validation process contemplated by the current disclosure.

Upon a payment event being initiated at merchant system 116, merchant system 116 may generate an authorization request comprising transaction data. Merchant system 116 may also include the key-hash pair in the authorization request. Specifically, the payment processing-related software may be configured to generate such an authorization request. At step 430, merchant system 116 may transmit the authorization request comprising transaction data and the key-hash pair to access management system 182, bypassing integrator system 172.

Access management system 182 may then perform steps to validate the authorization request. More specifically, access management system 182 may validate merchant system 116 from which the authorization request is originated, using the key-hash pair included in the authorization request. In essence, access management system 182 ensures that merchant system 116 has been authorized to transmit authorization requests to acquirer processor 122. In one embodiment, access management system 182 may extract the key-hash pair from the authorization request, compare the key-hash pair with the previously-stored primary keys and hash values (i.e., reference key-hash pairs), and determine whether there is a match. In other words, access management system 182 may validate the primary key and hash value from the key-hash pair against primary keys and hash values previously-generated and stored by access management system 182. If there is a match, at step 435, access management system 182 may transmit the authorization request to acquirer processor 122 for further processing. The authorization request transmitted to acquirer processor 122 may or may not comprise the key-hash pair. If there is no match however, access management system 182 may not allow the authorization request to pass through to acquirer processor 122, and may transmit a decline message to integrator system 172 or merchant system 116.

Figure 5:
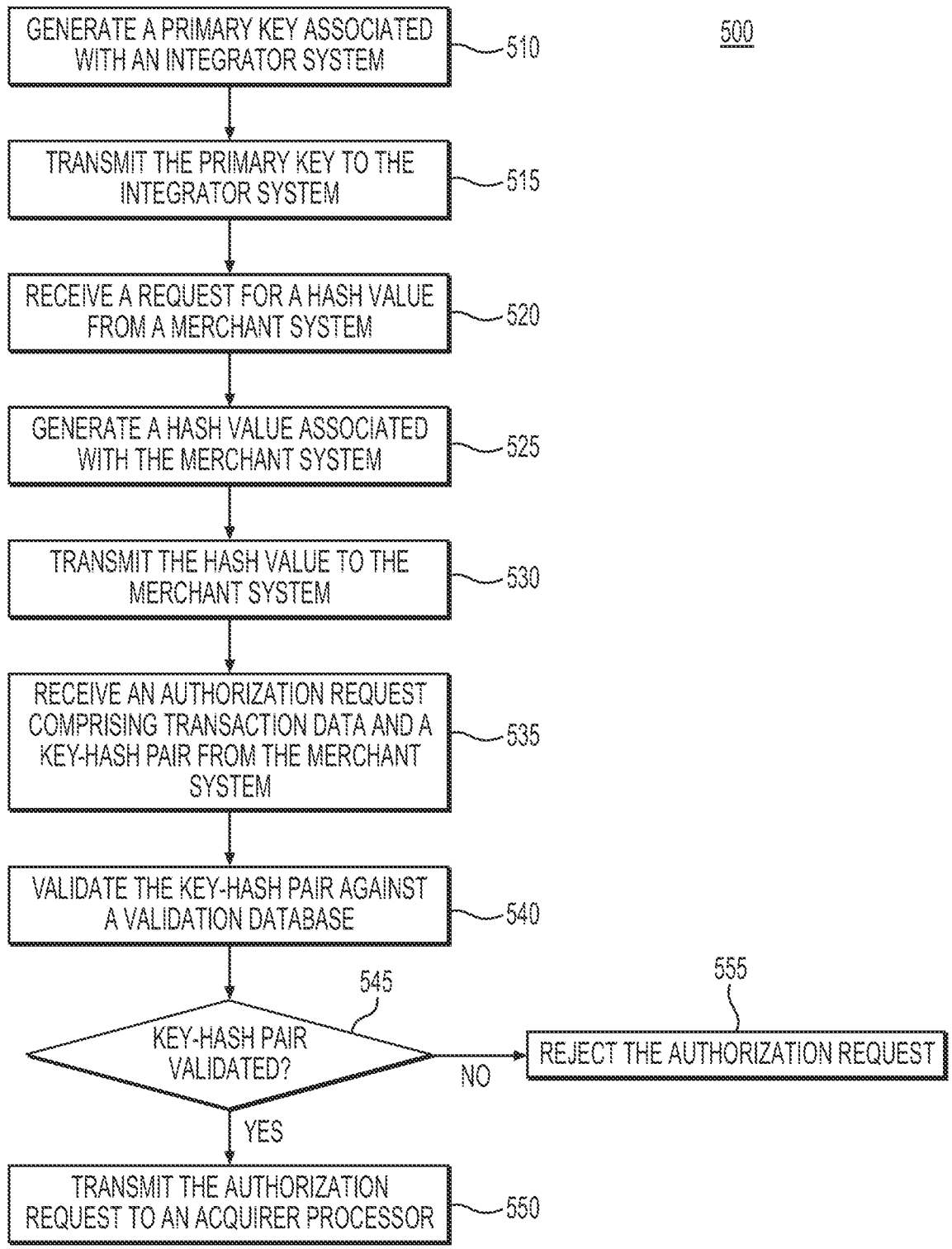
FIG. 5 is a flowchart illustrating another exemplary method of validating an authorization request, according to one aspect of the present disclosure.

FIG. 5 is a flowchart illustrating an exemplary method of validating an authorization request, according to one aspect of the present disclosure. Notably, method 500 may be performed by access management system 182, and may correspond to the steps performed by access management system 182 in the exemplary scenario illustrated in FIG. 4. At step 510, access management system 182 may generate a primary key associated with integrator system 172. As described above, the primary key may be unique to integrator system 172. At step 515, access management system 182 may transmit the primary key to integrator system 172. Integrator system 172 may then deploy payment processing-related software to merchant system 116, and may also transmit the primary key to merchant system 116.

The payment processing-related software may be installed on merchant system 116, and may transmit a request for a hash value to access management system 182 during a first boot or update. Accordingly, at step 520, access management system 182 may receive a request for a hash value from merchant system 116. At step 525, access management system 182 may generate a hash value associated with merchant system 116, responsive to the request. As described above, the hash value may be unique to merchant system 116. At step 530, access management system 182 may transmit the hash value to merchant system 116.

Upon a payment event initiated at merchant system 116, merchant system 116 may generate and transmit an authorization request comprising transaction data and a key-hash pair to access management system 182. At step 535 therefore, access management system 182 may receive an authorization request comprising transaction data and a key-hash pair from merchant system 116. At step 540, access management system 182 may validate the key-hash pair against validation database 184. As alluded to above, validation database 184 may comprise primary keys and hash values that were previously generated for integrator systems and merchant systems, respectively (i.e., reference key-hash pairs), across the network (e.g., Internet). At step 545, access management system 182 may determine whether a primary key and a hash value that match the primary key and the hash value of the key-hash pair exist in the validation database 184 (i.e., whether a reference key-hash pair that matches the key-hash pair in the authorization request exists in the validation database 184). If there is a match, method 500 may proceed to step 550, where access management system 182 may transmit the authorization request to acquirer processor 122. If there is no match (i.e., any one of the key-hash pair does not have a matching value in the validation database 184), method 500 may proceed to step 555, where access management system 182 may reject the authorization request, and transmit a decline message to merchant system 116.

Figure 6:
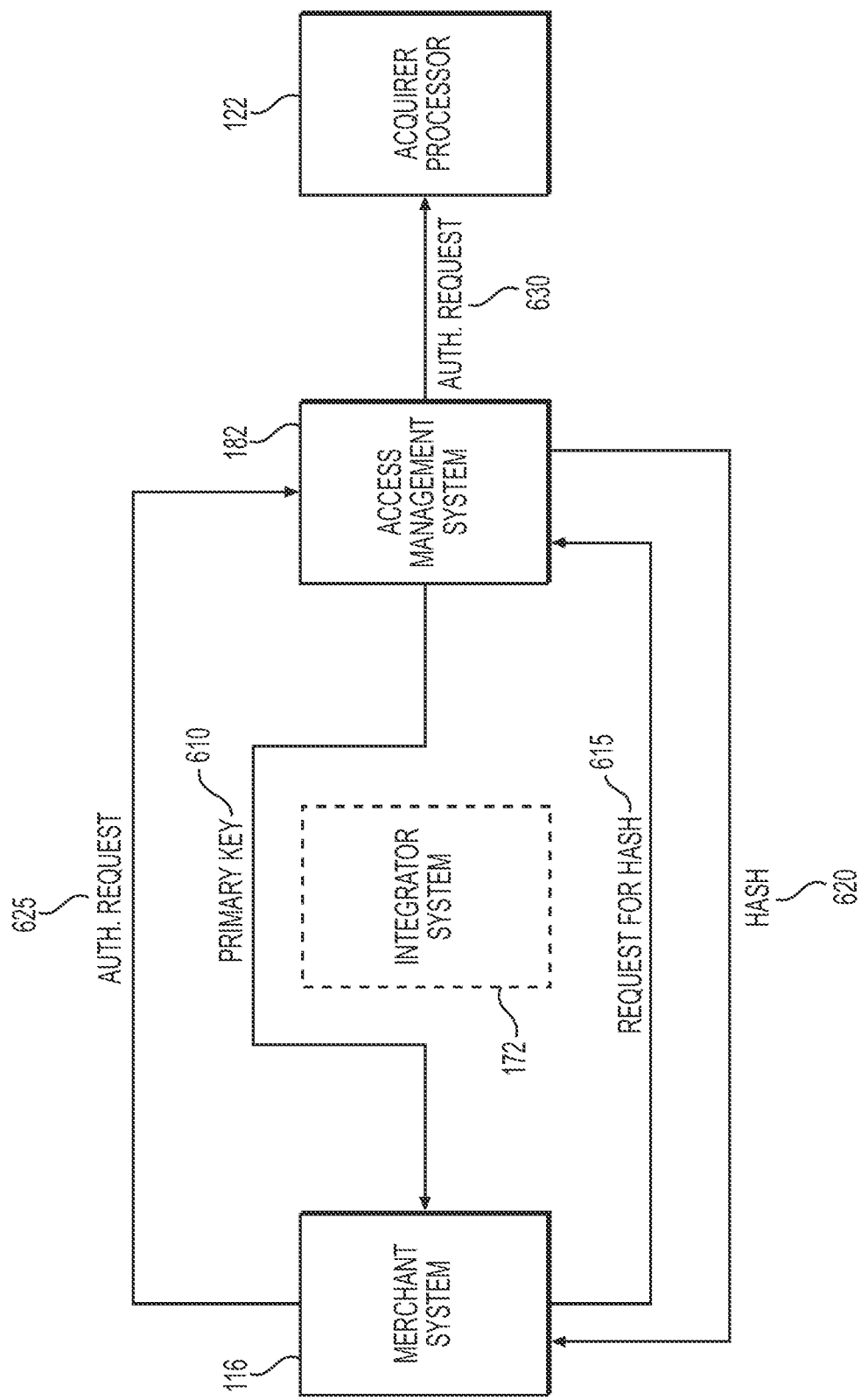
FIG. 6 is a schematic block diagram illustrating yet another exemplary scenario in which access management system may perform validation of an authorization request, according to one aspect of the present disclosure.

FIG. 6 is a schematic block diagram illustrating yet another exemplary scenario in which access management system 182 may perform validation of authorization request 120, according to one aspect of the present disclosure. Notably, FIG. 6 illustrates a scenario where merchant system 116 may be directly integrated with access management system 182. Under the scenario illustrated in FIG. 6, integrator system 172 may not be necessary for merchant system 116 to receive software update/deployment, authorization request routing, and/or any other services provided by integrator system 172, as access management system 182 may be configured to provide all or a portion of those services to merchant system 116 via direct integration. Therefore, integrator system 172 is represented as a dotted box in FIG. 6, meaning an integrator system may exist within the overall payment environment but may not play any role in merchant system identity validation in the scenario depicted in FIG. 6.

In contrast to the scenarios illustrated in FIGS. 2 and 4, access management system 182 may first generate a primary key that is unique to merchant system 116. Merchant system 182 may generate the primary key to be unique to merchant system 116 (i.e., not integrator system 172) since merchant system 116 may be directly integrated with access management system 182 without integrator system 172. The primary key may generated by applying a key-generating algorithm to a string of text or block of data that is unique to, or that uniquely identifies merchant system 116. As a result, the primary key may be unique to merchant system 116. Access management system 182 may then store the primary key in a local storage or in a remote storage in communication with access management system 182 (e.g., validation database 184). Access management system 183 may also be configured to deploy payment processing-related software to merchant system 116. At step 610, access management system 182 may transmit the payment processing-related software and primary key to merchant system 116. In some embodiments, the primary key may be "embedded" within the deployed software. In other embodiments, the primary key and payment processing-related software may be transmitted to merchant system 116 separately (e.g., as separate data objects). The payment processing-related software may then be automatically installed on the merchant system 116, or may be installed manually by an operator of the merchant system 116. Merchant system 116 may also store the primary key in a local storage or in a remote storage in communication with merchant system 116.

During a first boot or update following the installation, the software received from access management system 182 may be configured to automatically call out to access management system 182 for a hash value unique to merchant system 116. For instance, at step 615, the payment processing-related software installed on merchant system 116 may transmit a request for a hash value to access management system 182. Upon receiving the request for a hash value, access management system 182 may generate the hash value by applying a hash function to a string of text or block of data that is unique to, or that uniquely identifies merchant system 116. As a result, the hash value may be unique to merchant system 116. Access management system 182 may then store the hash value in a local storage or in a remote storage in communication with access management system 182 (e.g., validation database 184). At this point, access management system 182 may have both the primary key and the hash value associated with merchant system 116. This reference key-hash pair (i.e., the primary key and hash value that are associated with a merchant system and stored at access management system 182) may be used by access management system 182 to validate incoming authorization requests and other data originating from merchant system 116. At step 620, access management system 182 may transmit the hash value to merchant system 116. Upon receiving the hash value, merchant system 116 may store the hash value in a local storage or in a remote storage in communication with merchant system 116. In some embodiments, merchant system 116 may store the hash value in association with the primary key received at step 610. The combination of the primary key and the hash value (i.e., key-hash pair) may uniquely identify merchant system 116, and may be used in a validation process contemplated by the current disclosure.

Upon a payment event being initiated at merchant system 116, merchant system 116 may generate an authorization request comprising transaction data. Merchant system 116 may also include the key-hash pair in the authorization request. Specifically, the payment processing-related software may be configured to generate such an authorization request. At step 625, merchant system 116 may transmit the authorization request comprising transaction data and the key-hash pair to access management system 182.

Access management system 182 may then perform steps to validate the authorization request. More specifically, access management system 182 may validate merchant system 116 from which the authorization request is originated, using the key-hash pair included in the authorization request. In essence, access management system 182 ensures that merchant system 116 has been authorized to transmit authorization requests to acquirer processor 122. In one embodiment, access management system 182 may extract the key-hash pair from the authorization request, compare the key-hash pair with the previously-stored primary keys and hash values (i.e., reference key-hash pairs), and determine whether there is a match. In other words, access management system 182 may validate the primary key and hash value from the key-hash pair against primary keys and hash values previously-generated and stored by access management system 182. If there is a match, at step 630, access management system 182 may transmit the authorization request to acquirer processor 122 for further processing. The authorization request transmitted to acquirer processor 122 may or may not comprise the key-hash pair. If there is no match however, access management system 182 may not allow the authorization request to pass through to acquirer processor 122, and may transmit a decline message to merchant system 116.

Figure 7:
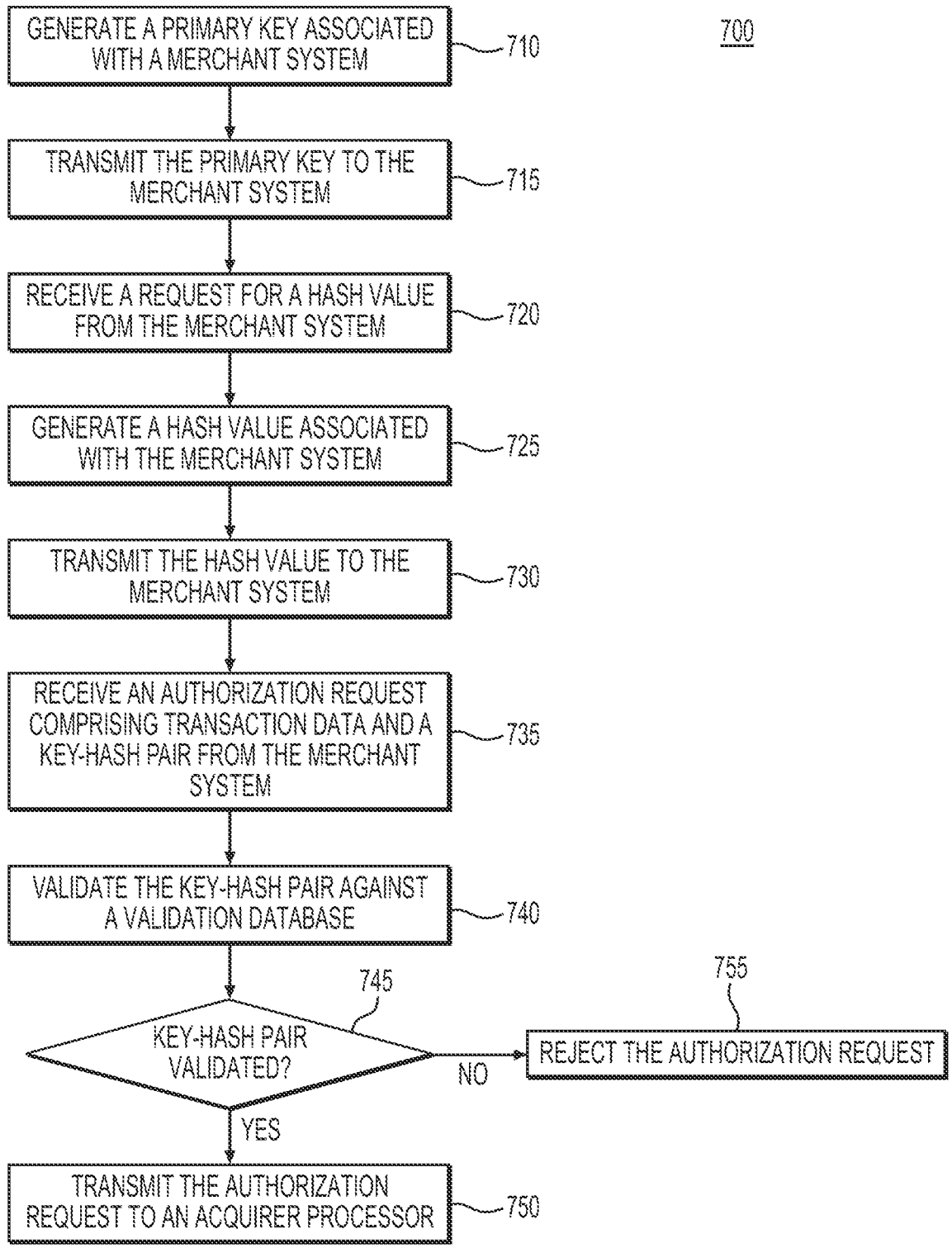
FIG. 7 is a flowchart illustrating yet another exemplary method of validating an authorization request, according to one aspect of the present disclosure.

FIG. 7 is a flowchart illustrating an exemplary method of validating an authorization request, according to one aspect of the present disclosure. Notably, method 700 may be performed by access management system 182, and may correspond to the steps performed by access management system 182 in the exemplary scenario illustrated in FIG. 6. At step 710, access management system 182 may generate a primary key associated with merchant system 116. As described above, the primary key may be unique to merchant system 116. At step 715, access management system 182 may transmit the primary key to merchant system 116, along with payment processing-related software. In some embodiments, the software and the primary key may be transmitted at different times.

The payment processing-related software may be installed on merchant system 116, and may transmit a request for a hash value to access management system 182 during a first boot or update. Accordingly, at step 720, access management system 182 may receive a request for a hash value from merchant system 116. At step 725, access management system 182 may generate a hash value associated with merchant system 116, responsive to the request. As described above, the hash value may be unique to merchant system 116. At step 730, access management system 182 may transmit the hash value to merchant system 116.

Upon a payment event initiated at merchant system 116, merchant system 116 may generate and transmit an authorization request comprising transaction data and a key-hash pair to access management system 182. At step 735 therefore, access management system 182 may receive an authorization request comprising transaction data and a key-hash pair from merchant system 116. At step 740, access management system 182 may validate the key-hash pair against validation database 184. As alluded to above, validation database 184 may comprise primary keys and hash values that were previously generated for integrator systems and merchant systems, respectively (i.e., reference key-hash pairs), across the network (e.g., Internet). At step 745, access management system 182 may determine whether a primary key and a hash value that match the primary key and the hash value of the key-hash pair exist in the validation database 184 (i.e., whether a reference key-hash pair that matches the key-hash pair in the authorization request exists in the validation database 184). If there is a match, method 700 may proceed to step 750, where access management system 182 may transmit the authorization request to acquirer processor 122. If there is no match (i.e., any one of the key-hash pair does not have a matching value in the validation database 184), method 700 may proceed to step 755, where access management system 182 may reject the authorization request, and transmit a decline message to merchant system 116.

The key-hash pairs assigned to merchant systems may also be used to block traffic from compromised merchant systems. For instance, if access management system 182 determines that a certain merchant system has been compromised, any inbound traffic coming from that merchant system may be "blocked" or "prevented" from reaching the acquirer processor 112. For instance, access management system 182 may flag the reference key-hash pair associated with the comprised merchant system, and authorization requests or any other data coming inbound with the key-hash pair matching the flagged reference key-hash pair may not be allowed access to acquirer processor 122. Using the key-hash pair, access management system 182 may be able to pinpoint and block traffic from each compromised merchant system. By assigning a unique key-hash pair to each merchant system (in contrast to having multiple merchant systems share login credentials to gain access to an acquirer processor), the merchant system identity validation method contemplated herein avoids having to disable or suspend multiple merchant systems that share login credentials with a particular merchant system, when that particular merchant system is determined to have been compromised.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 8:
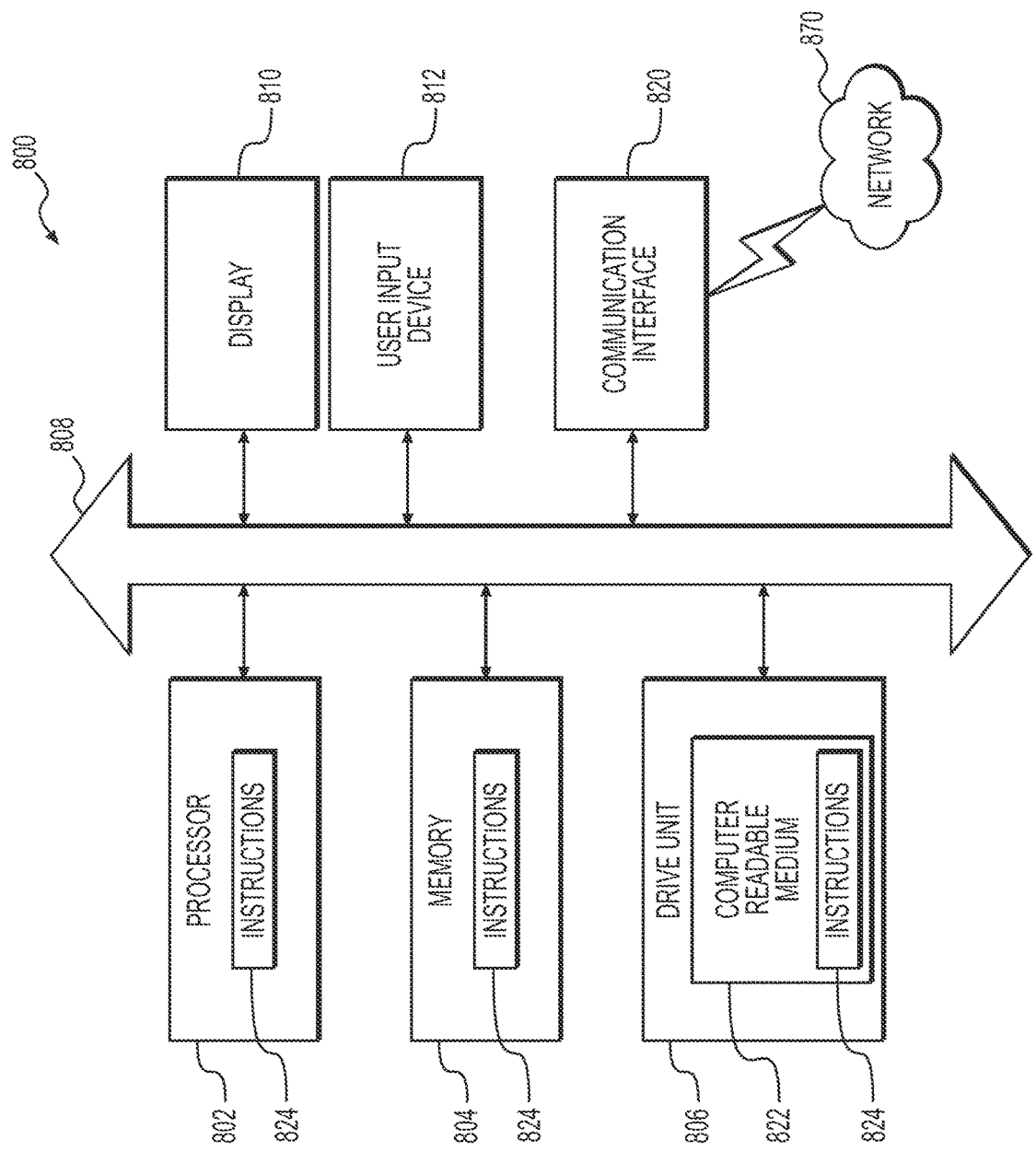
FIG. 8 illustrates a computer system that may perform the steps disclosed herein.

FIG. 8 illustrates an implementation of a general computer system designated 800. The computer system 800 can include a set of instructions that can be executed to cause the computer system 800 to perform any one or more of the methods or computer based functions disclosed herein. The computer system 800 may operate as a standalone device or may be connected, e.g., using a network, to other computer systems or peripheral devices.

In a networked deployment, the computer system 800 may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 800 can be implemented using electronic devices that provide voice, video, or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data. The processor 802 may implement a software program, such as code generated manually (i.e., programmed).

The computer system 800 may include a memory 804 that can communicate via a bus 808. The memory 804 may be a main memory, a static memory, or a dynamic memory. The memory 804 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 804 includes a cache or random-access memory for the processor 802. In alternative implementations, the memory 804 is separate from the processor 802, such as a cache memory of a processor, the system memory, or other memory. The memory 804 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 804 is operable to store instructions executable by the processor 802. The functions, acts or tasks illustrated in the figures or described herein may be performed by the programmed processor 802 executing the instructions stored in the memory 804. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 800 may further include a display unit 810, such as a liquid crystal display (LCD), an organic light emitting diode (OLED), a flat panel display, a solid-state display, a cathode ray tube (CRT), a projector, a printer or other now known or later developed display device for outputting determined information. The display 810 may act as an interface for the user to see the functioning of the processor 802, or specifically as an interface with the software stored in the memory 804 or in the drive unit 806.

Additionally or alternatively, the computer system 800 may include an input device 812 configured to allow a user to interact with any of the components of system 800. The input device 812 may be a number pad, a keyboard, or a cursor control device, such as a mouse, or a joystick, touch screen display, remote control, or any other device operative to interact with the computer system 800.

The computer system 800 may also or alternatively include a disk or optical drive unit 806. The disk drive unit 806 may include a computer-readable medium 822 in which one or more sets of instructions 824, e.g. software, can be embedded. Further, the instructions 824 may embody one or more of the methods or logic as described herein. The instructions 824 may reside completely or partially within the memory 804 and/or within the processor 802 during execution by the computer system 800. The memory 804 and the processor 802 also may include computer-readable media as discussed above.

In some systems, a computer-readable medium 822 includes instructions 824 or receives and executes instructions 824 responsive to a propagated signal so that a device connected to a network 870 can communicate voice, video, audio, images, or any other data over the network 870. Further, the instructions 824 may be transmitted or received over the network 870 via a communication port or interface 820, and/or using a bus 808. The communication port or interface 820 may be a part of the processor 802 or may be a separate component. The communication port 820 may be created in software or may be a physical connection in hardware. The communication port 820 may be configured to connect with a network 870, external media, the display 810, or any other components in system 800, or combinations thereof. The connection with the network 870 may be a physical connection, such as a wired Ethernet connection or may be established wirelessly as discussed below. Likewise, the additional connections with other components of the system 800 may be physical connections or may be established wirelessly. The network 870 may alternatively be directly connected to the bus 808.

While the computer-readable medium 822 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 822 may be non-transitory, and may be tangible.

The computer-readable medium 822 can include a solid-state memory such as a memory card or other package that houses one or more non-volatile read-only memories. The computer-readable medium 822 can be a random-access memory or other volatile re-writable memory. Additionally or alternatively, the computer-readable medium 822 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 800 may be connected to one or more networks 870. The network 870 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 870 may include wide area networks (WAN), such as the Internet, local area networks (LAN), campus area networks, metropolitan area networks, a direct connection such as through a Universal Serial Bus (USB) port, or any other networks that may allow for data communication. The network 870 may be configured to couple one computing device to another computing device to enable communication of data between the devices. The network 870 may generally be enabled to employ any form of machine-readable media for communicating information from one device to another. The network 870 may include communication methods by which information may travel between computing devices. The network 870 may be divided into sub-networks. The sub-networks may allow access to all of the other components connected thereto or the sub-networks may restrict access between the components. The network 870 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method for merchant system identity validation, comprising:
    transmitting, by an access management system, a primary key to the merchant system;
    transmitting, by the access management system, a hash value to a merchant system;
    receiving, by the access management system, an authorization request comprising a key-hash pair from the merchant system;
    determining, by the access management system, that the key-hash pair matches a reference key-hash pair stored in a validation database;
    validating, by the access management system, the key-hash pair based on determining that the key-hash pair matches the reference key-hash pair stored in the validation database; and
    transmitting, by the access management system, the authorization request to an acquirer processor based on validating the key-hash pair.

2. The method of claim 1, further comprising:
    generating, by the access management system, the primary key.

3. The method of claim 1, wherein the key-hash pair comprises the primary key and the hash value transmitted to the merchant system.

4. The method of claim 1, wherein the hash value is generated in response to a request for a hash value from the merchant system.

5. The method of claim 1, wherein the validation database comprises primary keys and hash values that are previously-generated by the access management system.

6. The method of claim 1, wherein the hash value is unique to the merchant system.

7. The method of claim 1, further comprising:
    generating, by the access management system, the hash value associated with the merchant system.

8. A system for merchant system identity validation, the system comprising:
    one or more processors;
    at least one data storage comprising instructions which, when executed by the one or more processors, cause the one or more processors of an access management system to perform operations comprising:
        transmitting, by the access management system, a primary key to a merchant system;
        transmitting, by the access management system, a hash value to the merchant system;
        receiving, by the access management system, an authorization request comprising a key-hash pair from the merchant system;
        determining, by the access management system, that the key-hash pair matches a reference key-hash pair stored in a validation database;
        validating, by the access management system, the key-hash pair based on determining that the key-hash pair matches the reference key-hash pair stored in the validation database; and transmitting, by the access management system, the authorization request to an acquirer processor based on validating the key-hash pair.

9. The system of claim 8, wherein the operations further comprise:
generating, by the access management system, the primary key.

10. The system of claim 8, wherein the key-hash pair comprises the primary key and the hash value transmitted to the merchant system.

11. The system of claim 8, wherein the hash value is generated in response to a request for a hash value from the merchant system.

12. The system of claim 8, wherein the validation database comprises primary keys and hash values that are previously-generated by the access management system.

13. The system of claim 8, wherein the hash value is unique to the merchant system.

14. A non-transitory computer readable medium for merchant system identity validation, the non-transitory computer readable medium storing instructions which, when executed by one or more processors of an access management system, cause the one or more processors to perform operations comprising:
transmitting, by the access management system, a primary key to a merchant system;
transmitting, by the access management system, a hash value to the merchant system;
receiving, by the access management system, an authorization request comprising a key-hash pair from the merchant system;

determining, by the access management system, that the key-hash pair matches a reference key-hash pair stored in a validation database;
validating, by the access management system, the key-hash pair based on determining that the key-hash pair matches the reference key-hash pair stored in the validation database; and
transmitting, by the access management system, the authorization request to an acquirer processor based on validating the key-hash pair.

15. The non-transitory computer readable medium of claim 14, wherein the operations further comprise:
generating, by the access management system, the primary key.

16. The non-transitory computer readable medium of claim 14, wherein the key-hash pair comprises the primary key and the hash value transmitted to the merchant system.

17. The non-transitory computer readable medium of claim 14, wherein the hash value is generated in response to a request for a hash value from the merchant system.

18. The non-transitory computer readable medium of claim 14, wherein the validation database comprises primary keys and hash values that are previously-generated by the access management system.

19. The non-transitory computer readable medium of claim 14, wherein the hash value is unique to the merchant system.

20. The non-transitory computer readable medium of claim 14, wherein the operations further comprise:
generating, by the access management system, the hash value associated with the merchant system.

* * * * *